United States Patent [19]

Du Vall

[11] 4,331,037

[45] May 25, 1982

[54] FLUID FLOW MEASURING APPARATUS

[75] Inventor: Zell Du Vall, St. Paul, Minn.

[73] Assignee: TSI Incorporated, St. Paul, Minn.

[21] Appl. No.: 155,312

[22] Filed: Jun. 2, 1980

[51] Int. Cl.³ ............................................... G01F 1/56
[52] U.S. Cl. .................................. 73/861.09; 73/189
[58] Field of Search ....................... 73/188, 189, 861.09

[56] References Cited

U.S. PATENT DOCUMENTS

| 2,709,365 | 5/1955 | Piety | 73/155 |
| 3,188,862 | 6/1965 | Roth | |
| 3,317,790 | 5/1967 | Whitby | |
| 3,470,741 | 10/1969 | Durbin | |
| 3,648,517 | 3/1972 | Dorman | |
| 3,831,445 | 8/1974 | Durbin | 73/861.09 |

FOREIGN PATENT DOCUMENTS

| 2024431 | 1/1980 | United Kingdom | 73/861.09 |
| 2043380 | 10/1980 | United Kingdom | 73/861.09 |

OTHER PUBLICATIONS

"Development of a Corona Anemometer for Measurement of Stratospheric Turbulence", Air Force Geophysics Laboratory, National Bureau of Standards, Mar. 21, 1978.

Primary Examiner—Charles A. Ruehl
Attorney, Agent, or Firm—Burd, Bartz & Gutenkauf

[57] ABSTRACT

A fluid movement measuring apparatus having ion collecting electrical conductors spaced from an ion generating source. Ions migrating across the space are deflected by moving fluid in the direction of the fluid flow. Electrical currents caused by ions collected on the separate electrical conductors are directed to differential amplifiers. The differential amplifiers provide output voltages that are proportional to the differences in current collected by opposed electrical conductors. These output voltages provide information as to the movement, such as velocity and direction, of the fluid flowing in the fluid flow path.

44 Claims, 12 Drawing Figures

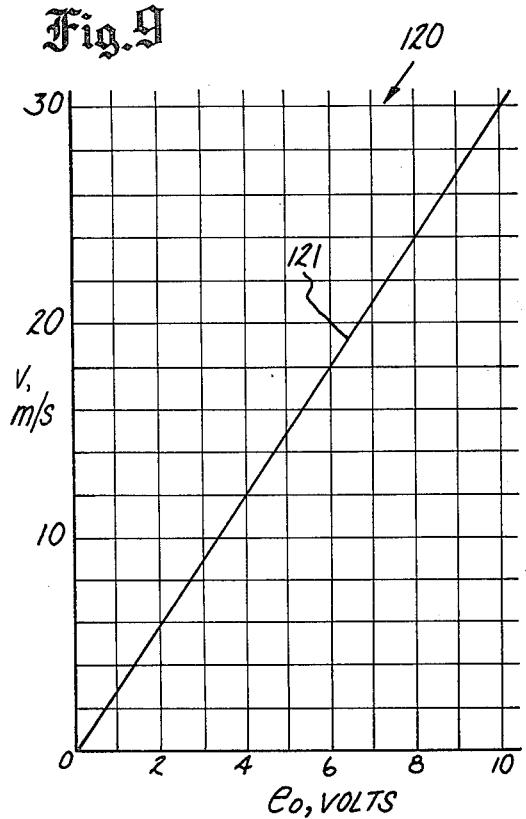
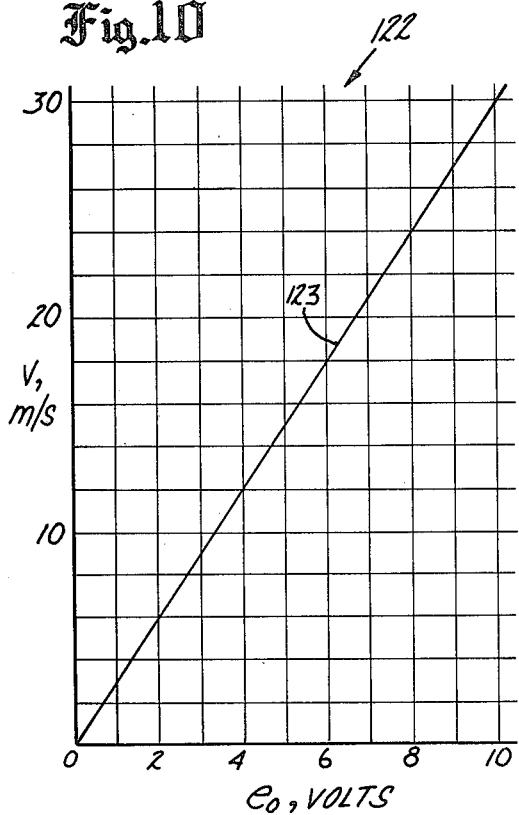
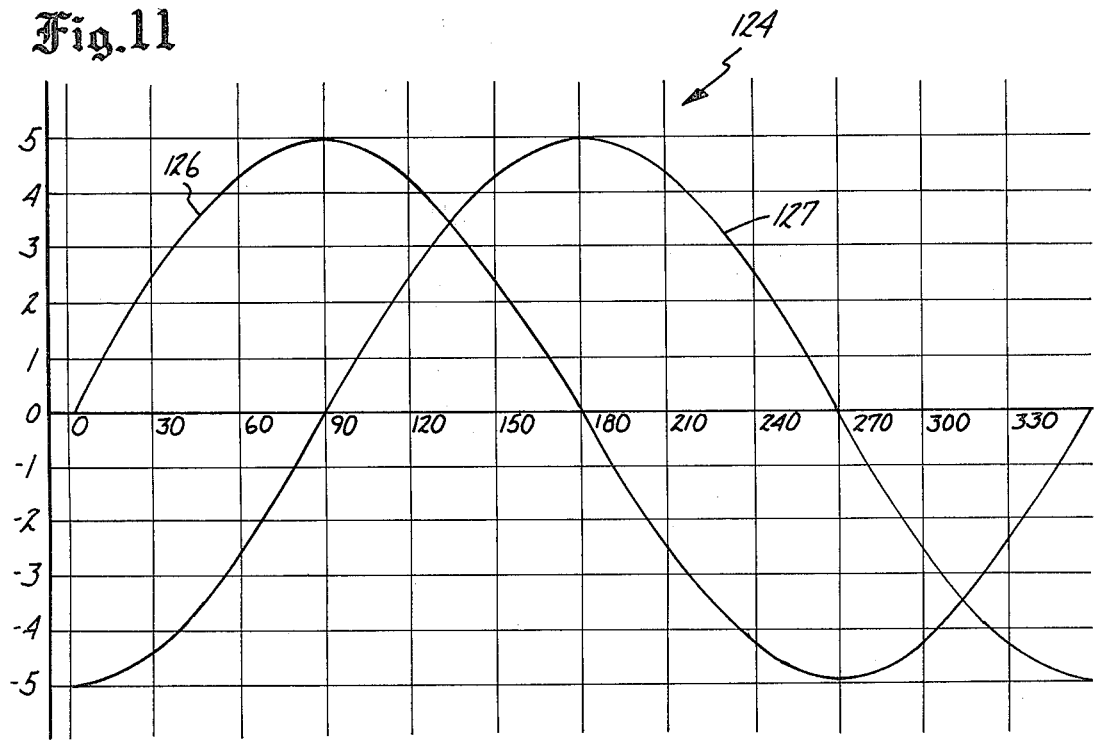

FLUID FLOW MEASURING APPARATUS

SUMMARY OF INVENTION

The invention is directed to an apparatus for the measurement of the movement of a flowing fluid, such as the velocity and direction of atmospheric air.

The apparatus is useable on movable and stationary supports to sense and measure velocity and direction of a moving fluid, as a gas, air or wind. An ionizing means is connected to a high voltage ionizing power source and establishes a supply of ions. The ionizing means is located in a protected chamber of a housing means. The housing means has a grounded disc partially closing the chamber. The disc has a central hole aligned with the ionizing means. An ion collecting means is spaced from the disc to form therewith a protected fluid flow path. The housing means supports the ion collecting means. The housing means has non-linear passages in communication with the fluid flow allowing fluid to flow through the housing means. The non-linear fluid flow pattern minimizes velocity effects due to the presence of external structure and supporting parts for the apparatus. The housing means minimizes detrimental effects of rain, dust, rocks, and other foreign matter from getting into the flow path and causing damage or electrical short to the ionizing means and/or ion collecting means.

When the high voltage ionizing power source is applied to the ionizing means, ions migrate across the fluid flow path providing an ion field. The ions that cross the path impinge upon the ion collecting means. The ion collecting means has a plurality of separated conductor plates that carry current in proportion to the ions that are collected on the plates. The apparatus measures actual velocity of the fluid which is proportional to ions collected on the plates. In one example, the ion collecting means has four generally pie-shaped plates. The plates are separated from each other and are concentrically located in side-by-side annular arranged positions. In another embodiment, the ion collecting means has two one-half circular shaped plates linearly separated from each other.

The ion collecting plates of these embodiments are electrically coupled to a differential amplifier circuit. The differential amplifier circuit produces output voltages that are proportional to the difference in current collected by opposed current collector plates. The output voltages provide information as to the movement of the fluid flowing in the fluid flow path.

The invention includes a fluid movement measuring apparatus having an ion collecting means provided with four quadrant electrical conductor members. Each member has a general pie shape with side edges normally disposed relative to each other. Adjacent member have side edges that are spaced from each other. Ionizing means spaced from the conductor members generate ions that migrate across a fluid flow path and impinge on apex sections of each conductor member. When there is no fluid flow in the path, the currents resulting from the ions that impinge on the conductor members are substantially equal. Moving fluid in the flow path will cause ions to deflect in the direction of the fluid flow. This produces differences in currents in the conductor members. An amplifier means is electrically connected to each conductor member. The amplifier means receives the total current from all the conductor members and provides output signals, $U_x$ and $U_y$, as to the differences in the currents of opposite pairs of conductor members. These output signals are used to provide information as to the velocity and direction of fluid moving in the flow path.

The apparatus has no moving parts and requires only minimum maintenance. It is rugged in constructiion and versatile in use with numerous types of flowing fluid. It can be used as an instrument providing continuous in-situ air movement information. These and other uses and advantages of the apparatus are set out in the drawings and following specification.

IN THE DRAWINGS

FIG. 9 is a graph of test results on $V_x$ linearity of the apparatus of FIGS. 1—6;

FIG. 10 is a graph of test results on $V_y$ linearity of the apparatus of FIGS. 1—6;

FIG. 11 is a graph of test results on angular sensitivity of the apparatus of FIGS. 1-6.

DESCRIPTION OF PREFERRED EMBODIMENT

Figure 1:
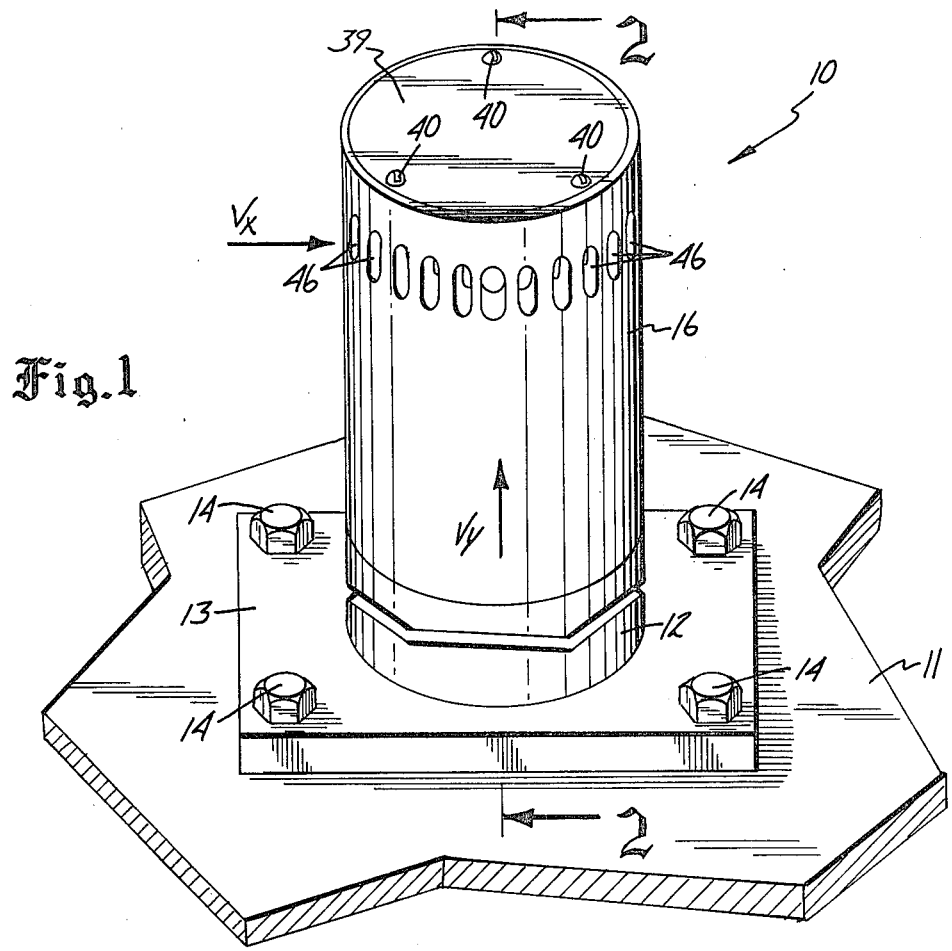
FIG. 1 is a foreshortened perspective view of an apparatus of the invention for measuring atmospheric air velocity and direction.
Figure 2:
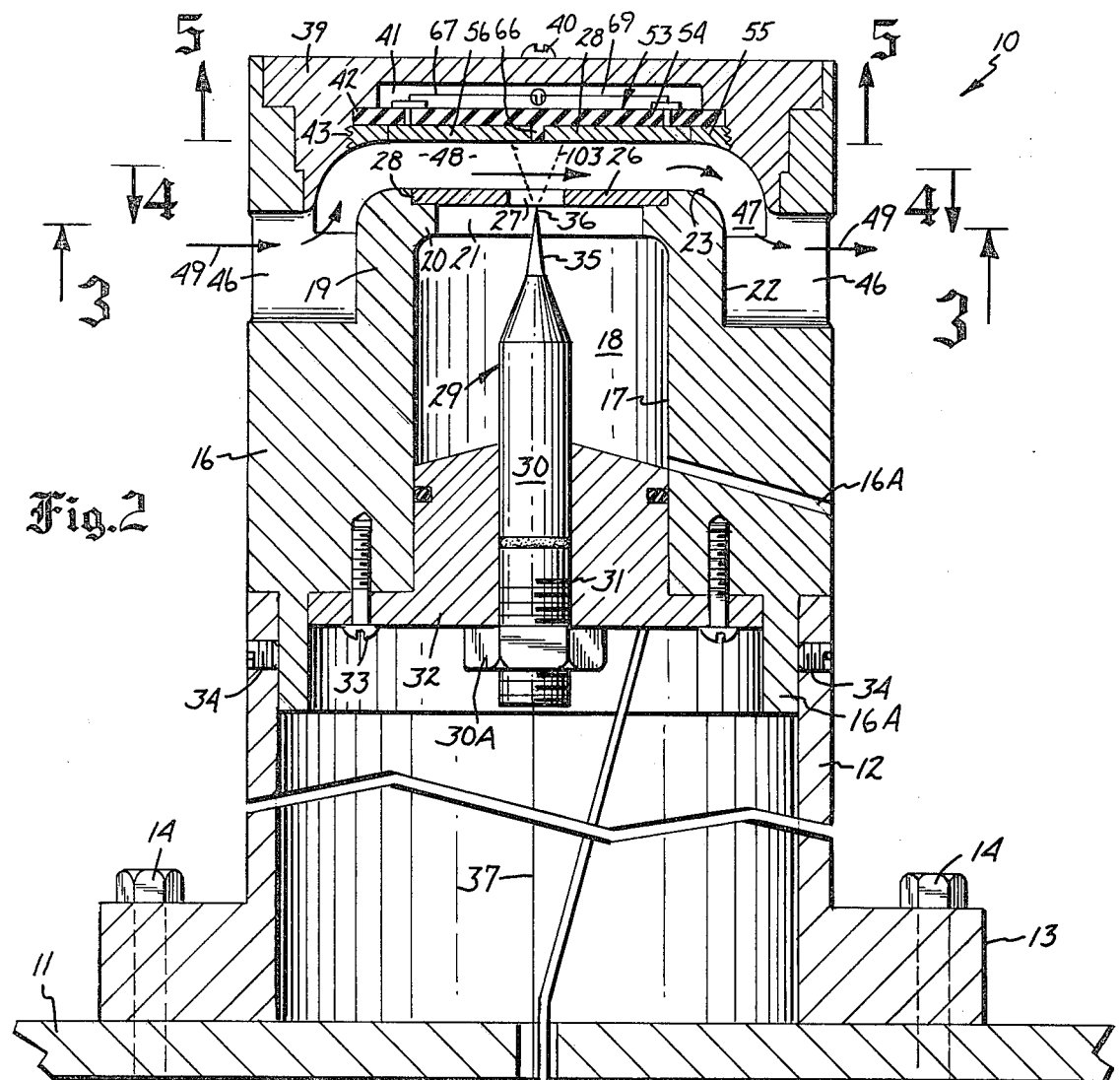
FIG. 2 is an enlarged sectional view taken along the line 2—2 of FIG. 1.

Referring to FIGS. 1 and 2, there is shown an apparatus indicated generally at 10 for measurement of movement, i.e., velocity and direction, of atmospheric air. The term movement, as herein used, refers to either velocity or speed of a flowing fluid and both the velocity and direction of a flowing fluid. Apparatus 10 can be used to measure the movement of other flowing fluids and the direction of flow of these fluids. The following description is directed to measurement of velocity and direction of moving atmospheric air.

Appratus 10 is secured to a support 11, such as a vehicle or similar mobile unit. Support 11 can be a stationary structure. Apparatus 10 is mounted on top of a post or cylindrical member 12. Post 12 is attached to a base or plate 13. A plurality of bolts 14 secured base 13 to support 11. Other means can be used to attach base 13 to support 11 and casing 12; for example, base 13 can be threaded into a hole in support 11.

Appartus 10 has a housing or casing 16 having an inside cylindrical wall 17 surrounding a chamber 18. The upper portion of casing 12 has a cylindrical sleeve or tubular projection 19. The upper end of sleeve 19 has an inwardly directed annular lip 20 surrounding an opening 21 in communication with chamber 18. Sleeve 19 has a cylindrical outside wall 22 that is joined to an annular flat top wall 23. Top wall 23 has an annular shoulder 24 forming a groove or recess accommodating an end member comprising an electrical conductive or metal disc or washer 26. Washer 26 has a central hole 27 axially aligned with the longitudinal axis of chamber 18. The outer edge 28 of washer 26 cooperates with an annular wall on sleeve 19 to mount washer 26 on sleeve 19 in engagement with lip 20. The upper surface of washer 26 is flat and coplanar with top wall 23.

As shown in FIG. 2, an ion source means indicated generally at 29 is located in chamber 18. Ion source means 29 includes a cylindrical post 30 having a threaded and end turned in a threaded hole 31 in a hub 32. Bolts 33 secure hub 32 to the bottom of casing 16. An annular portion 16A of casing 16 telescopes into the top of post 12. Set screw 34 in post 12 engage casing portion 16A to attach casing 16 to post 12. Post 30 insulatively supports a needle 35 having a point end 36. Needle 35 is located along the longitudinal central axis of chamber 18 in longitudinal alignment with the center of hole 27 in washer 26. Point 36 is located a short distance below hole 27 so that washer 26 protects needle 35 from foreign material carried with the air moving through apparatus 10. Post 30 can be longitudinally adjusted on hub 31 by releasing the lock nut 30A and rotating post 30. This allows adjustment of the distance between needle point 36 and hole 27 of washer 26. A line 37 connects needle 35 with a high voltage source 38. Ion source means 29 generates an ion current or beam 103 that moves from needle point 36 due to the field generated by the high voltage applied to needle 35 by high voltage source 38. The shape and size of the ion beam 103 is adjusted or turned by adjusting the distance between needle point 36 and washer 26. Washer 26 collects the peripheral ions emanating from needle 35. Casing 16 has an inclined small hole 16A allowing fluid, as water, to flow out of chamber 18.

Figure 3:
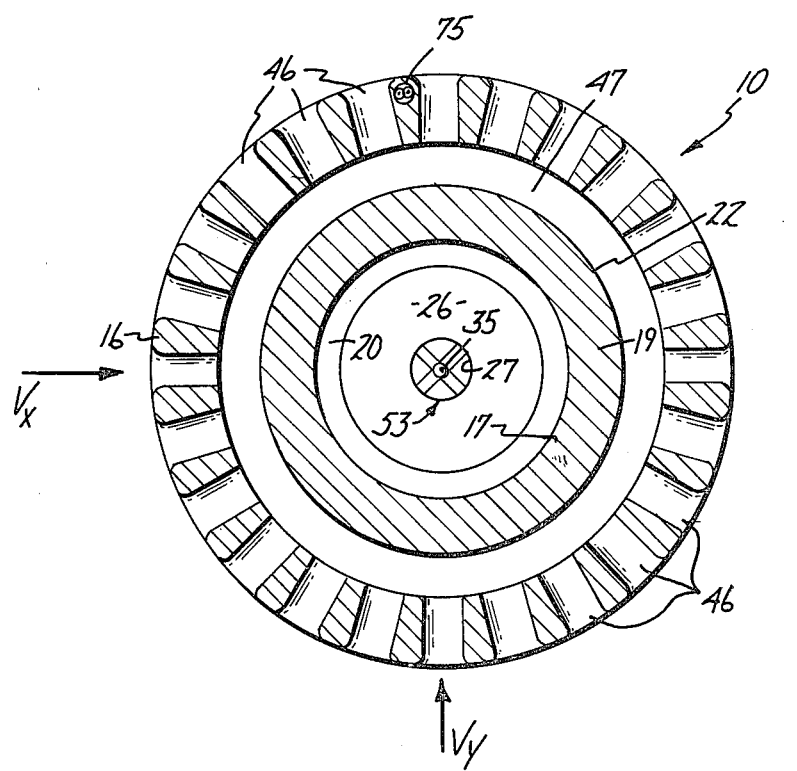
FIG. 3 is a sectional view taken along the line 3—3 of FIG. 2.
Figure 5:
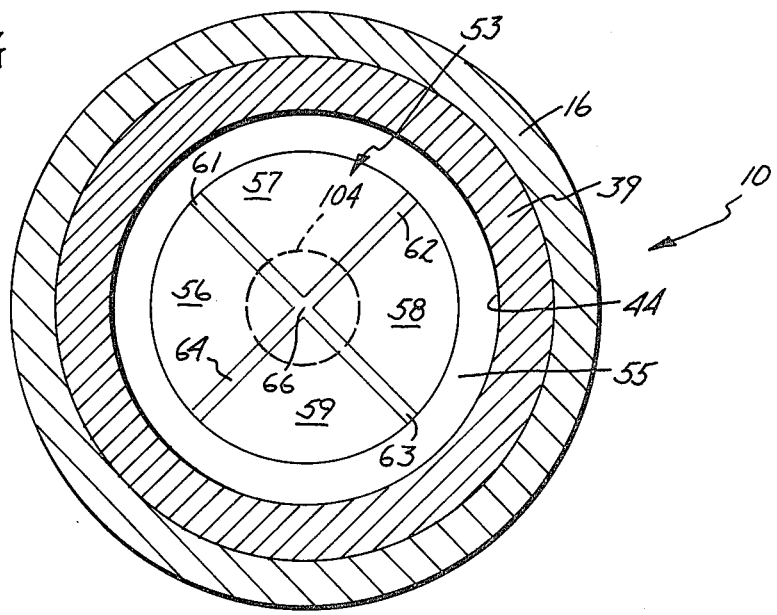
FIG. 5 is a sectional view taken along the line 5—5 of FIG. 2.

As shown in FIGS. 1 and 2, a cap 39 comprising a second member of the housing is attached with a plurality of bolts 40 to the top of casing 16. The bottom of cap 39 has a recess or pocket 41 surrounded by a wall having an annular shoulder 42. A threaded annular wall 43 extends downwardly from shoulder 42 and merges with an inside annular concave smooth wall 44. Casing 16 has a plurality of holes 46. Holes 46 are circumferentially spaced from each other and are in connection with an annular passage of chamber 47. As shown in FIG. 1, holes 46 are elongated in an upright or longitudinal direction and extended radially into casing 16. As shown in FIG. 3, twenty-four holes 46 are circumferentially spaced around casing 16. Each hole 46 is open to a separate arcuate portion of the common annular chamber 47. Annular chamber 47 extends upwardly and opens into a circular space or a protected flow path 48. Walls 22 and 44 define opposite sides of chamber 47. Top wall 23 and washer 26 are located at a level above the top of holes 46 so that the air flow, indicated by arrows 49, is non-linear as it moves from one or more holes 46. The adjacent edge of conductor plates 56-59 extend along parallel cord lines on opposite sides of a radial line. The lateral space or gap between the adjacent edges of the conductor plates 56-59 is uniform. Referring to FIGS. 2 and 5, an ion collector means or ion collector plate assembly indicated generally at 53 covers recess 41 and forms the top wall for flow path 48. Collector plate means 53 has an electrically non-conductive circular base 54 of plastic, glass, ceramic, or the like held in engagement with annular shoulder 42 with a ring 55. Ring 55 has external threads which cooperate with threads 43 to hold base 54 in a fixed position on head 38. Other means, as a press fit or adhesive, can be used to secure ring 55 to head 38. Ring 55 is an electrically non-conductive annular member that can be removed to permit the ion collector means 53 to be removed and replaced.

As shown in FIG. 5, ion collecting means 53 has four quadrant electrical conductor members or plates 56, 57, 58, and 59 attached to the lower surface of base 54 in an annular pattern. As shown in FIG. 5, the adjacent linear edges of the quadrant conductor plates 56-59 are isolated or spaced from each other with radial strips 61, 62, 63, and 64. Strips 61-64 are non-electrical conductive members that are merged or joined to each other at center 66. As shown in FIG. 2, center 66 as in longitudinal alignment with needle point 36 and the axis of hole 27 in washer 26.

Figure 6:
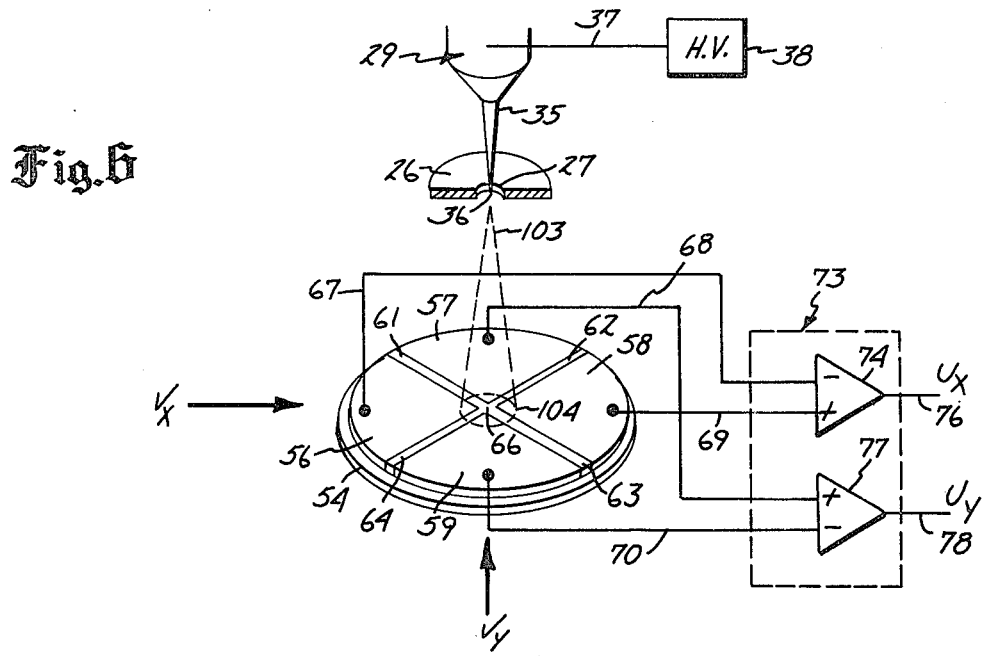
FIG. 6 is a diagrammatic view of a quadrant ion collection plate assembly connected to a differential amplifier circuit.

Each conductor plate 56-59 is connected to an amplifier circuit indicated generally at 73 with separate lines 67, 68, 69, and 70. Lines 67-70 form a cable that is located in a passage 75 in casing 16 and cap 39. As shown in FIG. 6, line 67 is connected to segment 56. Line 68 is connected to segment 57. Line 69 is connected to segment 58. Line 70 is connected to segment 59. Lines 67 and 69 are connected to a differential amplifier 74 joined to a first output line 76 for carrying output signals $U_x$. Lines 68 and 70 are connected to a second differential amplifier 77 joined to an output line 78 for carrying the second output signal $U_y$. Amplifer circuit 73 receives the total current imparted on the ion collector means 53 by the ion beam 103. The output signals $U_x$ and $U_y$ from amplifiers 74 and 77 are directly proportional to the differences in currents in plates 55 and 58, and 57 and 59, respectively. These current differences provide information as to the velocity and direction of air moving in the flow path 48.

Figure 7:
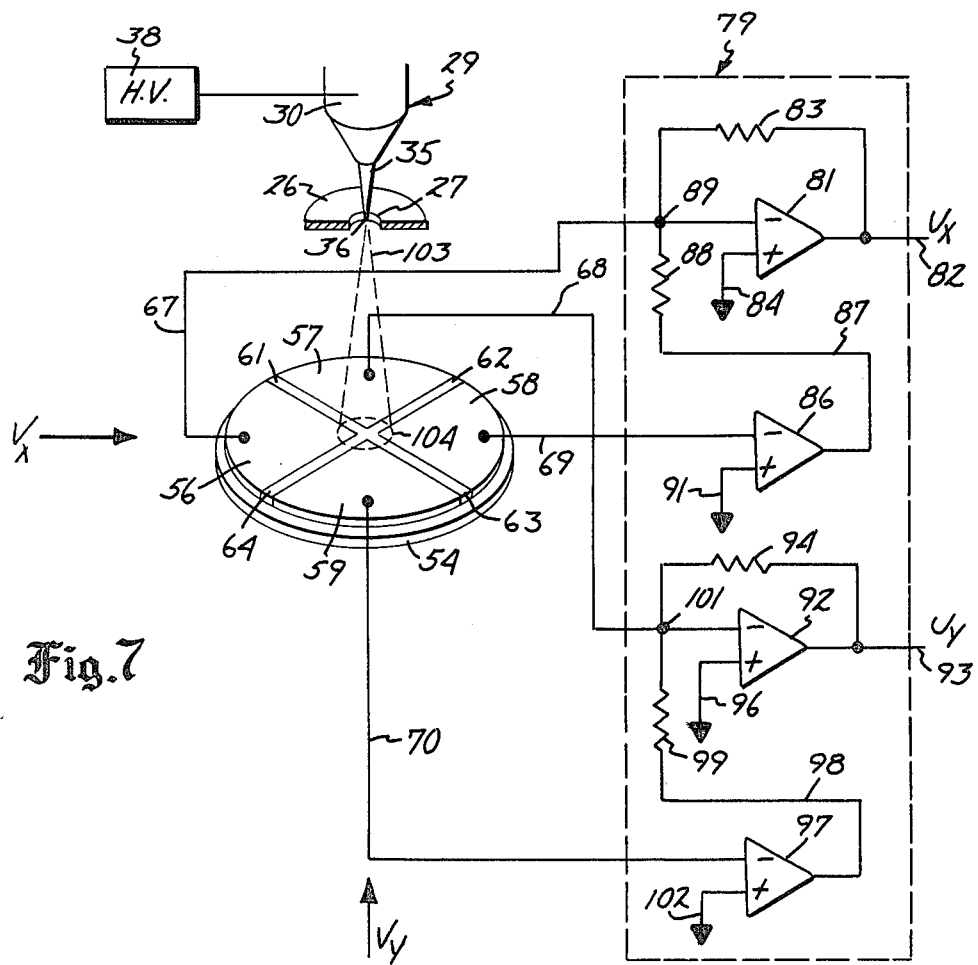
FIG. 7 is a diagrammatic view similar to FIG. 6 showing a modification of the amplifier circuit.

Referring to FIG. 7, there is shown a modification of the amplifier circuit indicated generally at 79 electrically coupled to the lines 67, 68, 69, and 70 leading from the ion collector plate means 53. Amplifier circuit 79 has a first differential amplifier 81 joined to line 67 and an output line 82 carrying the output signal $U_x$. A resistor 83 is connected to lines 67 and 82 in parallel with amplifier 81. A line 84 connects amplifier 81 to a power source. A second differential amplifier 86 connected to line 69 and an output line 87 is electrically coupled to line 67 through a resistor 88 and connection 89. The output of amplifier 86 is added to the input of the first differential amplifier 81. A line 91 connects amplifier 86 to a power source.

A third differential amplifier 92 is connected to an input line 68 and an output line 93. Output line 93 carries the output signal U. A resistor 94 is connected in parallel with amplifier 92 and is connected to lines 68 and 93. A line 96 connects amplifier 92 to a power source. A fourth differential amplifier 97 is connected to imput lines 70 and output line 98. Line 98 is connected with a resistor 99 and connection 101 to the imput line 68 of amplifier 92. A line 102 connects amplifier 97 to a power source.

As shown in FIG. 6, radial strips 61 and 64 are oriented at 45 degrees relative to the selected direction $V_x$ of the moving atmospheric air. In operation, the output voltage $U_x$ is proportional to the difference in current collected by collector plates 56 and 58. The output voltage $U_y$ is proportional to the difference in current collected by plates 57 and 59. Ion source generator 29 generates an ion field, as shown by broken line ion beam 103, that moves transversely across the air flow path 48 due to the field generated by the high voltage at needle point 36. The ions are collected on the apex sections of collector plates 56, 57, 58, and 59. When there is no movement of air through the passage 52, an equal number of ions will be collected on each of the plates 56–59. As the velocity of the air moving in flow path 48 increases, the ion beam will deflect due to the air motion. The amount of the deflection of the ion beam 103 is proportional to the velocity of the air moving in the flow path 48. In other words, an increase in air velocity $V_x$ will increase the ion beam deflection and increase the output voltage $U_x$. If the air velocity $V_x$ reverses direction, the output voltage $U_x$ will go negative.

Air flowing in the direction of vector $V_x$ moves in flow path 48 generally parallel to the radial center line of sector plates 56 and 58. The ion bean 103 will be deflected by the moving air in the direction of the flow of the air, i.e., parallel to radial center line of sector plates 56 and 58. The circular pattern 104 of ions collected on apex sections of plates 56 and 58 will shift to the right, as seen in FIG. 6, causing a decrease in current in plate 56 and an increase in current in plate 58. The greater the flow rate or speed of the air, the greater the ion beam shift. Amplifier output $U_x$ is directly proportional to the difference in the currents of plates 56 and 58 making the output insensitive to fluid means. Ion beam 103 encompasses portions of the apex sections of plates 57 and 59. The currents collected by the plates 57 and 59 will be equal when the air is moving in the direction of vector $V_x$, since the changes in the currents will be the same.

When the air is moving in the direction of vector $V_y$, ion beam 103 will be deflected upwardly, as seen in FIG. 6, causing a current difference in plates 57 and 59. Amplifier output is directly proportional to the difference in currents of plates 57 and 59. Amplifier output $U_x$ will not change as the current of plates 56 and 58 is the same when air moves in the $V_y$ direction.

When air moves along a vector between vectors $V_x$ and $V_y$, the new vector has $V_x$ and $V_y$ components. These air movement components will cause current differences between both pairs of plates 56, 58 and 57, 59. The difference in voltages $U_x$ and $U_y$ provides information as to the velocity of the air and the direction of movement of the air.

Figure 8:
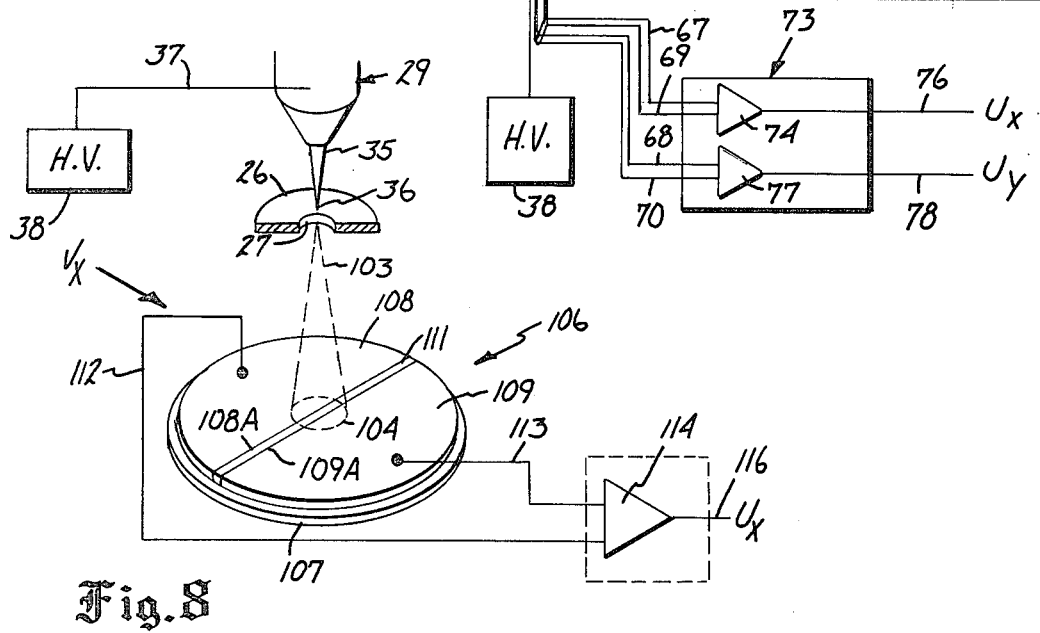
FIG. 8 is a diagrammatic view of a semi-circular ion collector plate assembly connected to a differential amplifier for measuring the velocity vector of a flowing air.
Figure 4:
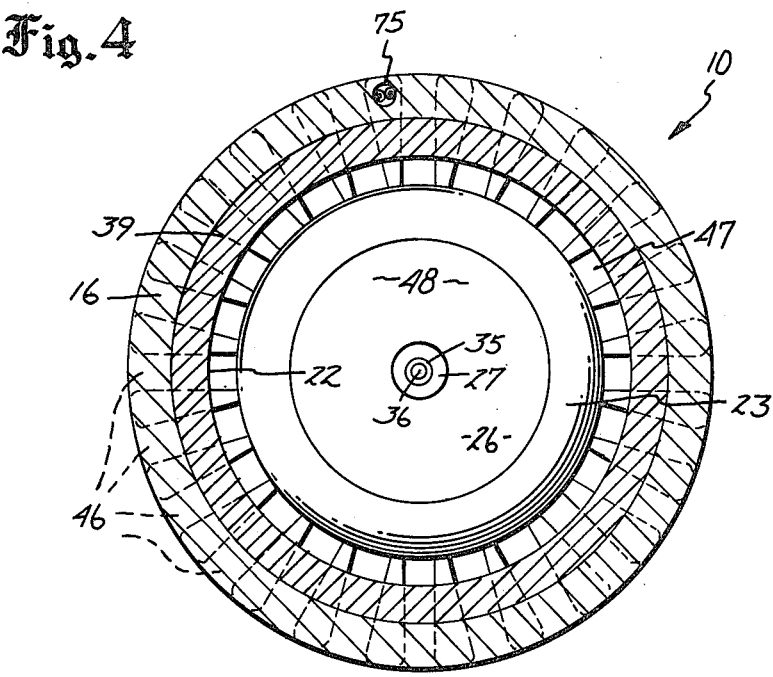
FIG. 4 is a sectional view taken along the line 4—4 of FIG. 2.

Referring to FIG. 8, there is shown a modification of the ion collector plate means indicated generally at 106 useable in the apparatus for measurement of the air velocity vector, $V_x$. The collector plate means 106 has electrically non-conductive circular base 107 supporting a pair of semi-circular conductor plates 108 and 109. The plates 108 and 109 have adjacent spaced parallel edges 108A and 109A, respectively, that extend diametrically across base 107. A transverse linear strip 111 of non-electrical conductive material separates the linear adjacent edges of conductor plates 108 and 109 from each other. Conductor plate 108 is connected with a line 112 to the negative terminal of a differential amplifier 114. Conductor plate 109 is connected with a line 113 to a positive terminal of differential amplifier 114. Amplifier 114 has an output line 116 accommodating the output voltage $U_x$.

In use, the ion source 29 generates an ion beam 103. The ion bean emanates from the needle point 36 toward the ion collector plate means 106. The ion beam 103 moves through hole 27 in washer 26 and spans the protected flow path 48. The ions that hit the plate means 106 are located within a circular pattern 104 concentric with the center of the ion collector plate means 106 when fluid is not flowing in passage 48. The linear strip 111 bisects pattern 104 when the air velocity $V_x$ is 0. The strip 111 between edges 108A and 109A is perpendicular to the air flow direction $V_x$. As the velocity of the air in the flow path 48 increases, the ion beam 103 will deflect in the direction of the movement of the air. The result will be an increase in the number of ions collected on the collector plate 109 and a decrease in the number of ions collected on the plate 108. The difference in the current in lines 112 and 113 will be amplified by the amplifier 114 which generates a positive output voltage $U_x$ proportional to the difference in the current collected by collector plates 108 and 109. The output voltage $U_x$ is a measure of the air velocity $V_x$.

FIG. 9 is graph 120 plotting the $V_x$ component of air velocity in meters per second versus the output voltage $U_x$ of amplifier 74. The output voltage $U_x$ has a linear relationship, shown by linear line 121, with respect to the $V_x$ component of velocity of the air.

As shown in FIG. 10, a linear relationship also exists for the $V_y$ component of velocity of the air. FIG. 10 is a graph 122 showing the linear line 123 plotting the $V_y$ component of air velocity in meters per second versus output voltage $V_y$ of amplifier 77.

FIG. 11 is a graph 124 showing the response of the apparatus when it is rotated 360 degrees. The curve 126 is a sine wave of recorded output voltage $V_x$ of amplifier 74 of the x component of the air velocity as the apparatus is rotated 360 degrees. The curve 127 is a sine wave of the recorded output voltage of $V_y$ of amplifier 77 of the y component of the air velocity as the apparatus is rotated 360 degrees. The sine wave responses show that the apparatus has utility for environmental wind measurements.

Figure 12:
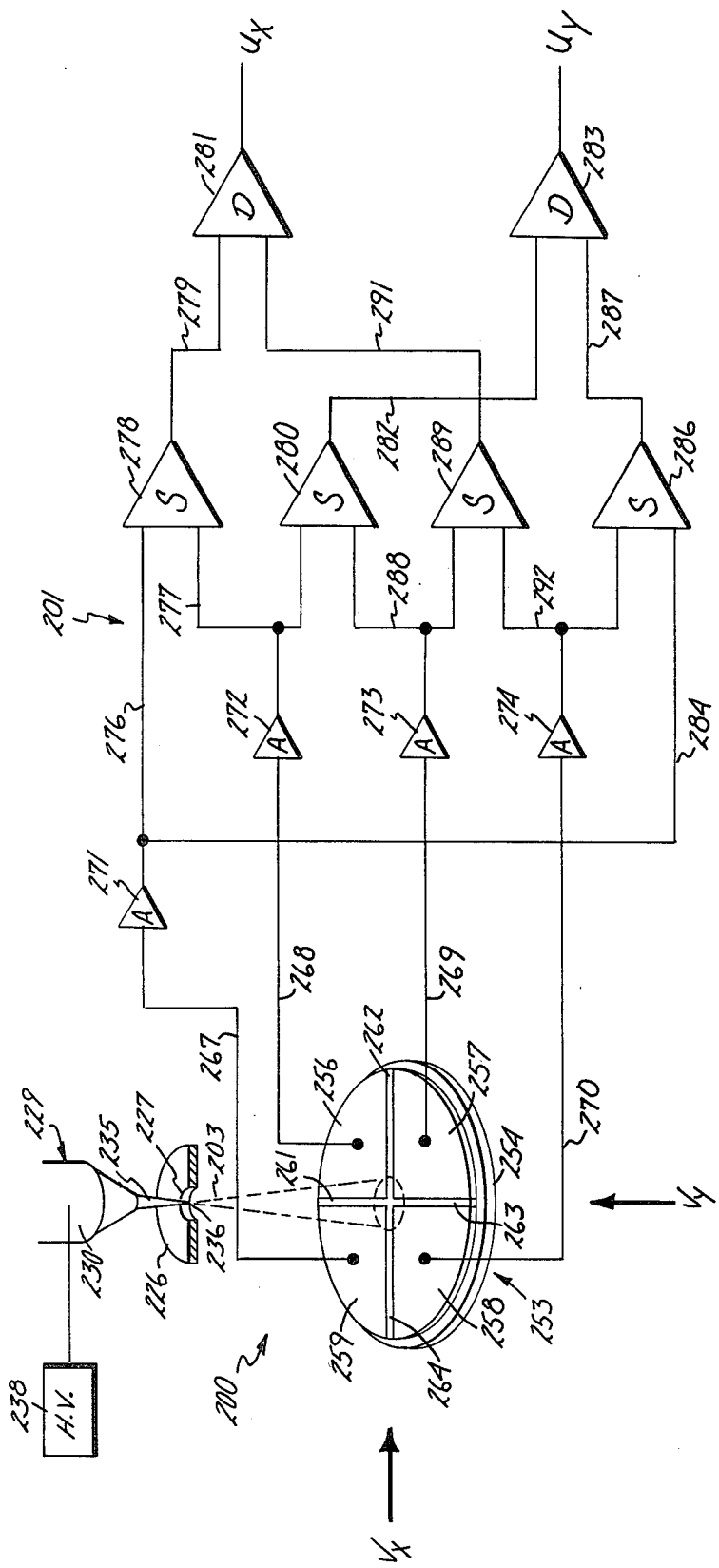
FIG. 12 is a digrammatic view of a guadrant ion collection plate assembly connected to a modified differential amplifier circuit.

Referring to FIG. 12, there is shown a fluid flow measuring apparatus, similar to the apparatus of FIGS. 1–5, indicated generally at 200 connected to a differential amplifier circuit indicated generally at 201. The structure of fluid flow measuring apparatus 200, identical to the structure of the apparatus shown in FIGS. 1–5, has the same reference numerals with the prefix 2. The radial strips 261 and 263 are oriented at 90 degrees relative to the selected direction $V_x$ of the moving air. The strips 262 and 264 are oriented 90 degrees relative to the direction $V_y$. The ion beam 203 emanating from the needle point 236 is directed toward the center of ion collector plate assembly 253. When there is no movement of air across the electrical conductor members 256, 257, 258, and 259, an equal number of ions will be collected on each of the members 256–259. As the velocity of the air moving relative to conductor members 256–259 increases, the ion beam 203 will deflect due to the air motion. The amount of the deflection of the ion beam 203 is proportional to the velocity of the air moving in the flow path adjacent conductor members 256–259. An increase in the velocity $V_x$ of the air will increase the ion beam deflection and thereby increase the output voltage $U_x$. If the velocity of $V_x$ *of reverses direction, the output voltage* $V_x$ will go negative. When the air is moving in the direction of vector $V_y$, ion beam 203 will deflect along the length of the strips 261 and 263 and thereby increase the ions collected by the conductor members 256 and 259 and increse the output voltage $U_y$.

The differential amplifier circuit 201 is connected to the conductor members 256–259 with separate lines 267, 268, 269, and 270. Amplifiers 271, 272, 273, 274 are interposed in the lines 267–270, respectively, to amplify the electrical signals. Amplifier 278. The output of summing amplifier 278 is carried via line 279 to a differential amplifier 281 having output voltage $U_x$. Amplifier 272 is connected with lines 277 to summing amplifier 278. Line 277 is also connected to summing amplifier 280. The output of summing amplifier 280 is carried via line 282 to a differential amplifier 283 having output voltage $U_y$.

A line 284 connects the output of amplifier 271 to a third summing amplifier 286. The output of amplifier 286 is connected via line 287 to differential amplifier 283. Amplifier 283 connected to conductor member 257 has an output line 288 connected to summing amplifiers 280 and 289. The summing amplifier 289 has an output line 291 connected to differential amplifier 282. Amplifier 274 is connected with output line 292 to summing amplifiers 286 and 289.

In operation, the output voltage $U_x$ is proportional to the difference in current collected by the conductor members 256, 259, and 257, 258. The difference between the two pairs of conductor members 256, 259, and 257, 258 provides a signal as to the direction of movement of the air relative to the conductor members 256–259. The amount of the difference between the currents collected by the conductor members 256–259 is proportional to the velocity of the air moving relative to the conductor members 256–259. The output of differential amplifiers 281 and 283 is non-linear. These signals must be linearized before they can be processed for vector and magnitude signals. A suitable micro-processor (not shown) is used to linearize the output signals from differential amplifiers 281 and 283.

While there has been shown and described several embodiments of the apparatus for measuring air movement, it is understood that changes in the structures and amplifier circuits may be made by those skilled in the art without departing from the invention. Also, the apparatus can be used to measure velocity and direction of other moving fluids, including gases other than air and a mixture of gas and particles. The invention is defined in the following claims.

The embodiments of the invention in which an exclusive property or privilege is claimed are defined as follows:

1. An apparatus for measuring the movement of a flowing fluid comprising: housing means having a chamber, a fluid flow path, a plurality of openings open to the outside of the housing means, and an annular passage between and in communication with the openings and the fluid flow path whereby fluid from outside of the housing means can flow through said flow path, ionizing means located in said chamber operable to produce ions, ion collecting means mounted on the housing means, said ion collecting means having a plurality of spaced ion collecting members, said fluid flow path located between the ionizing means and the ion collecting means, means for maintaining an electrical potential between the ionizing means and the ion collecting means whereby ions migrate from the ion collecting means across the fluid flow path and impinge on the ion collecting members producing a current in each ion collecting member, a member having a hole substantially closing one end of the chamber, said member being spaced from the ion collecting means a distance generally corresponding to the width of the fluid flow path, said ionizing means being located in the chamber in axial alignment with the hole in the member outside of the fluid flow path whereby ions migrate from the ionizing means through the hole and across the fluid flow path and impinge on the ion collecting means, said fluid moving in the fluid flow path deflecting said ions in an amount proportional to the movement of the fluid thereby producing different currents in at least some of said ion collecting members, and amplifier means connected to each ion collecting member for receiving current therefrom, said amplifier means having an output signal corresponding to the difference in current in at least two of the ion collecting members, said output signal providing information as to the movement of the flowing fluid.

2. The apparatus of claim 1 wherein: the housing means includes a first member having said chamber accommodating the ionizing means, and a second member mounted on the first member, said ion collecting means being attached to the second member, said first and second members having portions spaced from each other providing said fluid flow path.

3. The apparatus of claim 1 wherein: the member is a disc having a central circular hole.

4. The apparatus of claim 1 wherein: the ionizing means includes a needle axially aligned with said hole in the member.

5. The apparatus of claim 1 wherein: said openings and fluid flow path are located along different planes, said annular passage being annularly disposed around said fluid flow path.

6. The apparatus of claim 1 wherein: each ion collecting member comprises a generally pie-shaped plate having an apex section directed toward the mid-section of the ion collecting means.

7. The apparatus of claim 6 wherein: the side edges of each ion collecting member are normally disposed relative to each other.

8. The apparatus of claim 1 wherein: the ion collecting members comprise four generally pie-shaped plates, each plate having an apex section directed toward the mid-section of the ion collecting means and side edges spaced from side edges of an adjacent plate.

9. The apparatus of claim 8 wherein: the side edges of each ion collecting member are normally disposed relative to each other.

10. The apparatus of claim 1 wherein: the ion collecting members comprise a first conductor plate having a linear edge, and a second conductor plate having a linear edge, said linear edges of the conductor plate being spaced from each other.

11. The apparatus of claim 10 wherein: said space between said linear edges is aligned with the center of the opening in the end of the housing means.

12. The apparatus of claim 10 wherein: said amplifier means is electrically connected to the first and second conductor plates and provides an output signal representative of the difference in currents in the first and second conductor plates.

13. The apparatus of claim 1 wherein: the ion collecting members comprise first, second, third, and fourth conductor means including a first differential amplifier electrically connected to the first conductor member, a second differential amplifier electrically connected to the second conductor member, said second conductor member being located opposite the first conductor member, conductor means electrically connecting the second differential amplifier to the first differential amplifier, said first differential amplifier providing an output signal relating to fluid velocity in a first direction, a third differential amplifier connected to the third conductor member, a fourth differential amplifier connected to the fourth conductor member, electrical conductor means connecting the fourth differential amplifier with the input of the third differential amplifier, said third differential amplifier providing an output signal related to fluid velocity in a second direction.

14. The apparatus of claim 13 wherein: each first, second, third, and fourth conductor member has a generally pie shape with side edges spaced from side edges of adjacent conductor members.

15. The apparatus of claim 13 wherein: each conductor member is a segment of a circle having side edges disposed at an angle of about 90 degrees relative to each other.

16. The apparatus of claim 1 wherein: said ionizing means has a longitudinal axis aligned with the center of the ion collecting means.

17. An apparatus for measuring the velocity and direction of a fluid moving in a fluid flow path comprising: ionizing means located adjacent the fluid flow path for producing ions, ion collecting means located adjacent the fluid flow path and generally opposite the ionizing means, said ion collecting means having first separate electrical conductor members located opposite each other and second separate electrical conductor members located opposite each other, each conductor member having angularly related side edges, the side edges of adjacent members being spaced from each other, means for maintaining an electrical potential between said ionizing means and first and second separate electrical conductor members whereby ions migrate from the ionizing means and impinge on the first and second separate electrical conductor members producing a current in each conductor member, said fluid moving in the fluid flow path deflecting said ions in the direction of movement of the fluid and in an amount proportional to the velocity of the fluid thereby producing different currents in the opposite separate first and second electrical conductor members, and amplifier means electrically connected to each conductor member, said amplifier means having first differential amplifier means electrically connected to said first separate electrical conductor members and having a first output signal corresponding to the difference in current in said first separate electrical conductor members, said first output signal being related to fluid velocity in a first direction, and second differential amplifier means electrically connected to said second separate electrical conductor members and having a second output signal corresponding to the difference in current in said second electrical conductor members, said second output signal being related to fluid velocity in a second direction.

18. The apparatus of claim 17 wherein: the conductor members each comprise a generally pie-shaped plate having an apex section directed toward the mid-section of the ion collecting means.

19. The apparatus of claim 18 wherein: the side edges of each conductor member are normally disposed relative to each other.

20. The apparatus of claim 17 wherein: the first and second electrical conductor members comprise four generally pie-shaped plates, each plate having an apex section directed toward the mid-section of the ion collecting means and side edges spaced from side edges of an adjacent plate.

21. The apparatus of claim 20 wherein: the side edges of each conductor member are normally disposed relative to each other.

22. The apparatus of claim 17 wherein: the first and second electrical conductor members comprise first, second, third, and fourth conductor members located in an annular pattern with adjacent members spaced from each other.

23. The apparatus of claim 22 wherein: each first, second, third, and fourth conductor member has a generally pie shape with side edges spaced from side edges of adjacent conductor members.

24. The apparatus of claim 23 wherein: each conductor member is a segment of a circle having an angle of about 90 degrees.

25. The apparatus of claim 23 wherein: said ionizing means has a longitudinal axis aligned with a center point equally spaced from each conductor member.

26. The apparatus of claim 17 wherein: the first conductor members are segments of a circle having separate oppositely disposed apex sections, and the second conductor members are segments of a circle having separate oppositely disposed apex sections.

27. The apparatus of claim 26 wherein: each segment has side edges disposed at an angle of about 90 degrees relative to each other.

28. The apparatus of claim 17 wherein: the first conductor members have spaced opposed sections, and the second conductor members have spaced opposed sections.

29. The apparatus of claim 17 wherein: said ionizing means has a longitudinal axis aligned with the center of the ion collecting means.

30. An apparatus for measuring the movement of a fluid flowing in a fluid flow path comprising: ionizing means located adjacent the fluid flow path for producing ions, ion collecting means located adjacent the fluid flow path and generally opposite the ionizing means, said ion collecting means having a plurality of separated electrical conductor members, the conductor members include first separate conductor members and second separate conductor members, at least two of said conductor members having linear side edges, said side edges being spaced from each other, means for maintaining an electrical potential between said ionizing means and ion collecting means whereby ions migrate from the ionizing means and impinge on the conductor members producing a current in each conductor member, said fluid flowing in the fluid flow path deflecting said ions in the direction of movement of said fluid and in an amount proportional to the velocity of the fluid in the fluid flow path thereby producing different currents in at least some of said conductor members, and amplifier means electrically connected to each conductor member, said amplifier means having output signals proportional to the difference in the currents in selected conductor members, said amplifier means having a first differential amplifier electrically connected to said first conductor members, said first conductor members being located opposite each other to provide an output signal related to fluid velocity in the first direction, and a second differential amplifier electrically connected to said second conductor members, said second conductor members being located opposite each other to provide an output signal related to the fluid velocity in a second direction, said signals providing information as to the movement of the fluid flowing in said flow path.

31. The apparatus of claim 30 wherein: the first conductor members are segments of a circle having separate oppositely disposed apex sections, and the second conductor members are segments of a circle having separate oppositely disposed apex sections.

32. The apparatus of claim 31 wherein: each segment has side edges disposed at an angle of about 90 degrees relative to each other.

33. The apparatus of claim 31 wherein: the first conductor members have spaced opposed sections, and the second conductor members have spaced opposed sections.

34. An apparatus for measuring the movement of a flowing fluid comprising: housing means having a chamber, a fluid flow path, and a plurality of openings in communication with the flow path whereby fluid from outside of the housing can flow through said flow path, ionizing means located in the chamber operable to produce ions, ion collecting means mounted on the housing means, said ion collecting means having a plurality of spaced ion collecting members, said ion collecting members comprising first separate electrical conductor members located opposite each other and second separate electrical conductor members located opposite each other, said fluid flow path located between the ionizing means and the ion collecting means, means for maintaining an electrical potential between the ionizing means and the first and second separate electrical conductor members whereby ions migrate from the ion collecting means across the fluid flow path and impinge on the first and second separate electrical conductor members producing a current in each conductor member, said fluid moving in the flow path deflecting said ions in an amount proportional to the movement of the fluid thereby producing different currents in the opposite separate first and second electrical conductor members, and amplifier means connected to each conductor member for receiving current therefrom, said amplifier means having first differential amplifier means electrically connected to said first separate electrical conductor members and having a first output signal corresponding to the difference in current in said first separate electrical conductor members, said first output signal being related to fluid velocity in a first direction, and second differential amplifier means electrically connected to said second separate electrical conductor members and having a second output signal corresponding to the difference in current in said second separate electrical conductor members, said second output signal being related to fluid velocity in a second direction.

35. The apparatus of claim 34 wherein: the first electrical conductor members are segments of a circle having separate oppositely disposed apex sections, and the second electrical conductor members are segments of a circle having separate oppositely disposed apex sections, each of said segments being spaced from each other.

36. The apparatus of claim 35 wherein: each segment has an included angle of about 90 degrees.

37. The apparatus of claim 34 wherein: the first electrical conductor members have spaced opposed sections, and the second electrical conductor members have spaced opposed sections.

38. The apparatus of claim 34 wherein: said housing means has an annular passage between and in communication with the openings and the fluid flow path.

39. The apparatus of claim 38 wherein: said openings in said fluid flow path are located in different planes, said annular passage being annularly disposed around said fluid flow path.

40. An apparatus for measuring the movement of a fluid flowing in a flow path comprising: housing means having a first member including a generally cylindrical side wall and a second member mounted on the first member, a fluid flow path, said side wall having a plurality of circumferentially spaced openings open to the outside of the housing means extended around said side wall, and annular passage means between and in communication with said plurality of openings and the fluid flow path whereby fluid flows through said openings and annular passage into and out of said fluid flow path, and means for sensing the flow of fluid in said fluid flow path and providing information signals relating to the movement of fluid flowing in said flow path, said means for sensing the flow of fluid in said fluid flow path including ionizing means mounted on said first member, ion collecting means having a plurality of separate conductor members mounted on the second member, said ion collecting means being spaced from said first member to provide said fluid flow path, means for maintaining an electrical potential between said ionizing means and ion collecting means whereby ions migrate from the ionizing means and impinge upon the conductor members producing a current in each conductor member, said fluid flowing in the fluid flow path deflecting said ions in the direction of movement of the fluid and in an amount proportional to the velocity of the fluid, thereby producing different currents in at least some of the conductor members, and means connected to the conductor members having output signals directly proportional to the differences in the currents of selected conductor members of the ion collecting means, said signals providing information as to the velocity and direction of the moving fluid.

41. The apparatus of claim 40 wherein: said plurality of openings and fluid flow path are located in different generally parallel planes, said annular passage being annularly disposed around said fluid flow path.

42. The apparatus of claim 40 wherein: said plurality of circumferentially spaced openings comprise a single row of openings.

43. The apparatus of claim 42 wherein: said single row of openings are located laterally of a plane located in the fluid flow path and extended in the direction of fluid flow in said path.

44. The apparatus of claim 43 wherein: said annular passage is annularly disposed around said fluid flow path.

* * * * *